(12) United States Patent
Sun et al.

(10) Patent No.: US 8,462,868 B2
(45) Date of Patent: Jun. 11, 2013

(54) MULTIPLE SUB-CARRIER SELECTION DIVERSITY ARCHITECTURE AND METHOD FOR WIRELESS OFDM

(75) Inventors: Yang Sun, San Diego, CA (US); Prasad S. Gudem, San Diego, CA (US); Lawrence E. Larson, Del Mar, CA (US)

(73) Assignee: The Regents of the University of California, Oakland, CA (US)

( * ) Notice: Subject to any disclaimer, the term of this patent is extended or adjusted under 35 U.S.C. 154(b) by 1167 days.

(21) Appl. No.: 11/662,516

(22) PCT Filed: Sep. 22, 2005

(86) PCT No.: PCT/US2005/033976
§ 371 (c)(1),
(2), (4) Date: Jul. 12, 2007

(87) PCT Pub. No.: WO2006/034401
PCT Pub. Date: Mar. 30, 2006

(65) Prior Publication Data
US 2009/0122898 A1    May 14, 2009

Related U.S. Application Data

(60) Provisional application No. 60/612,409, filed on Sep. 23, 2004.

(51) Int. Cl.
*H04B 7/02* (2006.01)
*H04L 1/02* (2006.01)

(52) U.S. Cl.
USPC ............................. 375/267; 375/259; 375/260

(58) Field of Classification Search
USPC ........................................................ 375/267
See application file for complete search history.

(56) References Cited

U.S. PATENT DOCUMENTS

| | | | |
|---|---|---|---|
| 5,982,327 A * | 11/1999 | Vook et al. | 342/380 |
| 7,454,181 B2 * | 11/2008 | Banister et al. | 455/133 |
| 2003/0123383 A1 | 7/2003 | Korobkov et al. | |
| 2004/0029548 A1 | 2/2004 | Li | |
| 2004/0106412 A1 | 6/2004 | Laroia et al. | |

(Continued)

FOREIGN PATENT DOCUMENTS

EP    0600547    6/1994

OTHER PUBLICATIONS

A. R. Behzad et al., "A 5-GHz direct-conversion CMOS transceiver utilizing automatic frequency control for the IEEE 802.11a wireless LAN standard," Solid-State Circuits, IEEE Journal of Solid-State Circuits, vol. 38 , No. 12 , Dec. 2003, pp. 2209-2220.

(Continued)

*Primary Examiner* — Erin File
(74) *Attorney, Agent, or Firm* — Greer, Burns & Crain Ltd.

(57) ABSTRACT

Sub-carrier selection methods and receiver architectures for receiving an Orthogonal Frequency Division Multiplexing band sensed by a plurality of antennas ($10_1$-$10_N$). Filtering is applied to separately pass portions of the predetermined Orthogonal Division Multiplexing frequency band. Each separate portion encompasses one or more sub-bands of the predetermined Orthogonal Division Multiplexing frequency band. For each of the separate portions of the predetermined Orthogonal Division Multiplexing frequency band, the signal received from one of the plurality of antennas is selected. The selected signals for each separate portion are then combined in the time (analog) domain.

10 Claims, 8 Drawing Sheets

U.S. PATENT DOCUMENTS

| | | | |
|---|---|---|---|
| 2004/0135723 | A1 | 7/2004 | Nakaya et al. |
| 2004/0243657 | A1* | 12/2004 | Goren et al. ............... 708/607 |
| 2005/0031037 | A1* | 2/2005 | Carrasco et al. ......... 375/240.16 |
| 2005/0053170 | A1* | 3/2005 | Catreux et al. ............ 375/267 |
| 2005/0141412 | A1* | 6/2005 | Sadri et al. ............... 370/208 |
| 2005/0197079 | A1* | 9/2005 | Banister et al. ........... 455/135 |
| 2005/0237923 | A1* | 10/2005 | Balakrishnan et al. ....... 370/208 |
| 2006/0013186 | A1* | 1/2006 | Agrawal et al. ............ 370/344 |
| 2006/0128339 | A1* | 6/2006 | Petrovic ................... 455/296 |
| 2006/0198451 | A1* | 9/2006 | Guruprasad ............... 375/260 |
| 2007/0211786 | A1* | 9/2007 | Shattil ..................... 375/141 |

OTHER PUBLICATIONS

M. R. G. Butler et al., "The Performance of HIPERLAN/2 Systems with Multiple Antennas," Vehicular Technology Conference of May 2001, .Spring.IEEE VTS 53rd, May 2001, pp. 2123-2127.

D. Huang et al., "Pre-DFT Processing Using Eigenanalysis for Coded OFDM with Multiple Receive Antennas", *IEEE Transactions on Communications*, vol. 52, No. 11, Nov. 2004, pp. 2019-2027.

S. Pipilos et al., "A single-chip transceiver for 802.11a and Hiperlan2 wireless LANs," Radio Frequency Integrated Circuits (RFIC) Symposium, 2003 IEEE , Jun. 8-10, 2003 pp. 33-36.

I. Vassiliou et al., "A Single-Chip Digitally Calibrated 5.15-5.825-GHz 0.18-μm CMOS Transceiver for 802.11a Wireless LAN," IEEE Journal of Solid-State Circuits, vol. 38, No. 12, Dec. 2003, pp. 2221-2231.

P. Zhang et al., "A 5-GHz direct-conversion CMOS transceiver," IEEE Journal of Solid-State Circuits, vol. 38, No. 12 , Dec. 2003, pp. pp. 2232-2238.

IEEE Standard 802.11a, 1999 Edition, Wireless LAN Medium Access Control (MAC) and Physical Layer (PHY) Specifications—High-speed Physical Layer in the 5GHz Band, New York, IEEE reaffirmed 2003.

Sugbong Kang and J.S. Lehnert, "Receiver Diversity Scheme for OFDM Systems", *Electronics Letters*, vol. 39, No. 18, Sep. 4, 2003.

Sumeet Sandhu and Minnie Ho, "Analog Comining of Multiple Receive Antennas with OFDM", IEEE, vol. 5, May 11, 2003, pp. 3428-3432.

Yang Sun, Prasad Gudem and Lawrence E. Larson, "A Multiple Sub-carrier Selection (MSCS) Diversity Architecture with Reduced Receiver Complexity for Wireless OFDM Applications", *IEEE*, vol. 1, Sep. 26, 2004, pp. 439-442.

* cited by examiner

MULTIPLE SUB-CARRIER SELECTION DIVERSITY ARCHITECTURE AND METHOD FOR WIRELESS OFDM

PRIORITY CLAIM

This application claims priority under 35 U.S.C. §119 from U.S. Provisional Application Ser. No. 60/612,409, filed Sep. 23, 2004.

FIELD OF THE INVENTION

The field of the invention is wireless communications. The invention concerns Orthogonal Frequency Division Multiplexing (OFDM) receiver architectures. The invention is applicable, for example, to wireless local area networks (WLAN), such as 802.11a/b/g, but has general applicability to any wireless communication that utilizes OFDM, and those that may change to accommodate OFDM, e.g., cellular communication networks, and satellite communications such as satellite radio and satellite television networks.

BACKGROUND

High data transfer rates are achieved in wireless communications. Difficulties must be overcome to successfully transfer data over a wireless band at high rates. Noise, e.g., intersymbol interference, fading, etc., degrades the signal seen by the antenna of a receiver. One technique to address this is the use of multiple antennas and Orthogonal Frequency Division Multiplexing (OFDM). In OFDM, a wireless band is divided into a plurality of sub-bands and the information transmission is received by multiple antennas at the receiver end. The antenna signals from each of the antennas are converted to digital, then into the frequency domain, where selection of a signal for each sub-band occurs and then the sub-bands are combined and decoded.

Orthogonal Frequency Division Multiplexing (OFDM) has become popular for achieving high data rate and combating multipath fading in wireless communications. Currently, most standards for broadband wireless communications, such as IEEE 802.11a/g, ETSI-BRAN HIPERLAN/2 and DVB-T have adopted OFDM as the key technology. OFDM subdivides a carrier into several individually modulated orthogonal sub-carriers. In other words, the entire frequency selective fading channel can be decomposed into multiple flat fading ones to effectively mitigate the effects of delay spread and inter-symbol interference (ISI).

For example, in 802.11a, each channel is 20 MHz wide and is subdivided into 52 sub-carriers which are modulated using binary or quadrature phase shift keying (BPSP/QPSK), 16-quadrature amplitude modulation (QAM) or 64QAM, each spaced 312.5 kHz apart. Forty-eight of these sub-carriers are used for data, and the remaining four are pilot tones for error correction. The 802.11a standard specifies operations over 5.15-5.25, 5.25-5.35 and 5.725-5.825 GHz unlicensed national information structure (U-NII) bands. The 802.11a system provides data payload communication capabilities of 6, 9, 12, 18, 24, 36, 48, and 54 Mbit/s.

To mitigate channel fading, multiple antennas in the receiver can be used to achieve spatial diversity. Multiple Receive Antenna combining techniques can basically be split into two groups: frequency domain combining and time domain combining. Frequency domain combining can increase the performance of the OFDM system by combining signals based on the sub-carrier information after a discrete Fourier transform (DFT) processor, whereas time domain combining does the same thing before DFT processor, which relaxes the hardware complexity.

In terms of the bit error rate (BER) performance, the sub-carrier based frequency domain combining technique is optimum. See, e.g., Butler et al., "The Performance of HIPERLAN/2 System with Multiple Antennas," Vehicular Technology Conference, 2001. VTC 2001 Spring. IEEE VTS 53rd, Volume: 3, 6-9 (May 2001). However, the frequency domain combining technique uses multiple analog to digital (A/D) and discrete Fourier transform (DFT) processors, with an A/D and DFT for each receive antenna. Combining then occurs in the frequency domain. Therefore, frequency domain combining also can be referred to as post-DFT combining. Post-DFT combining is not a major problem in an access point (AP), but it is a big concern for a mobile terminal (MT), which benefits from lower hardware complexity and power demands. There are three types of well-known frequency domain combining techniques, selection diversity (SC), equal gain combining (EGC) and maximal ratio combining (MRC).

To reduce the hardware complexity of OFDM systems with multiple receive antennas, some time domain combining techniques have been proposed. In one technique with pre-DFT combining, the number of DFT processors can be dramatically reduced to one with some performance degradation. See, e.g., M. Okada, S. Komaki, "Pre-DFT Combining Space Diversity Assisted COFDM," IEEE Trans. Vehicular Tech., vol. 50, No. 2, pp. 487-496 (March 2001). However that approach requires multiple A/Ds and is only applicable when the number of distinct paths in the channel are very limited. Another approach that has been proposed makes use of single analog front-end with multiple receive antennas and single baseband demodulator, but sacrifices data transfer rate and needs additional processing on the transmitter side. See, Jung et al., "A Subcarrier Selection Combining Technique for OFDM Systems," IEICE Trans. Commun., Vol. E86-B, No. 7 (July 2003).

Hardware complexity can be dramatically reduced through simple antenna selection diversity as well. However, for frequency selective channels, there always exists the possibility that some sub-carriers of an OFDM symbol demodulated from the selected antenna may have lower amplitude than the corresponding sub-carriers of the other receive antennas. See, e.g., Jung et al., "A Subcarrier Selection Combining Technique for OFDM Systems," IEICE Trans. Commun., Vol. E86-B, No. 7 (July 2003). As a result, antenna selection diversity has substantially degraded performance compared to the case of optimum sub-carrier based Maximal Ratio Combining (MRC) for the case of two antennas.

SUMMARY OF THE INVENTION

In preferred embodiment sub-carrier selection methods and receiver architectures of the invention, a predetermined OFDM frequency band is sensed by a plurality of antennas. Filtering is applied to separately pass portions of the predetermined Orthogonal Division Multiplexing frequency band. Each separate portion encompasses one or more sub-bands of the predetermined Orthogonal Division Multiplexing frequency band. For each of the separate portions of the predetermined Orthogonal Division Multiplexing frequency band, the signal received from one of the plurality of antennas is selected. The selected signals for each separate portion are then combined in the time (analog) domain.

BRIEF DESCRIPTION OF THE DRAWINGS

FIG. 2A shows the sub-carrier location of the 802.11a band and FIG. 2B shows the complex filter response;

DETAILED DESCRIPTION OF THE PREFERRED EMBODIMENTS

The invention concerns a multiple sub-carrier selection diversity receiver architecture for WLAN OFDM systems with multiple antennas. With a small increase in analog complexity, significant gain can be achieved with the invention. Embodiments of the invention require only a single A/D and DFT, which eases the baseband hardware requirements significantly. In embodiments of the invention, a complex analog filter bank is inserted into each antenna RF front end, which is also part of channel selection filter. By detecting the power level at each complex filter output, the optimum band from each antenna filter may be selected to maximize the receiver output.

In preferred embodiment sub-carrier selection methods and receiver architectures of the invention, a predetermined OFDM frequency band, e.g., the 802.11a/g band, is sensed by a plurality of antennas. Filtering is applied to separately pass portions of the predetermined Orthogonal Division Multiplexing frequency band. Each separate portion encompasses one or more sub-bands of the predetermined Orthogonal Division Multiplexing frequency band. For each of the separate portions of the predetermined Orthogonal Division Multiplexing frequency band, the signal received from one of the plurality of antennas is selected. The selected signals for each separate portion are then combined in the time (analog) domain. Preferably, the strongest signal is selected. A single A/D converter and DFT can then be used to transform the combined analog signal, which includes each of the sub-bands of the predetermined Orthogonal Division Multiplexing frequency band. Decoding is then applied by conventional techniques.

Preferred embodiments of the invention provide receiver architectures that have low hardware complexity, with only a single A/D and a single DFT, while providing good performance. Preferred architectures of the invention are especially well-suited to mobile devices that demand power conservation as they rely upon portable power sources, e.g., batteries. Example mobile devices include lap top computers, personal digital assistants (PDAs), cellular handsets, and other devices that have WiFi, cellular, satellite, or other frequency bands using OFDM.

The invention will be illustrated by describing a preferred embodiment sub-carrier selection (MSCS) diversity combining receiver architecture for 802.11a/g Wireless OFDM applications. This architecture can approach the performance of optimum sub-carrier based combining with the hardware simplicity of selection combining. Artisans will appreciate broader aspects of the invention from the description of the preferred embodiments, and will appreciate the general applicability of the invention to any OFDM wireless receiver.

Figure 1A:
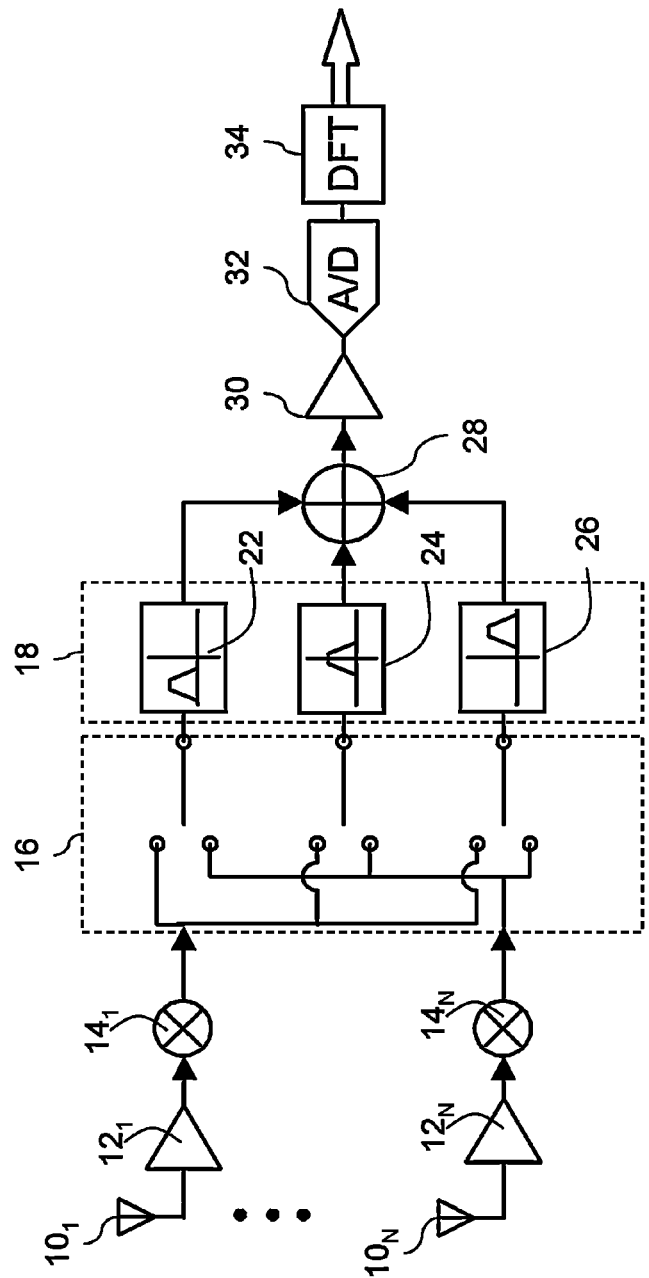
FIG. 1A is a block diagram illustrating a preferred embodiment wireless OFDM receiver architecture of the invention.
Figure 1B:
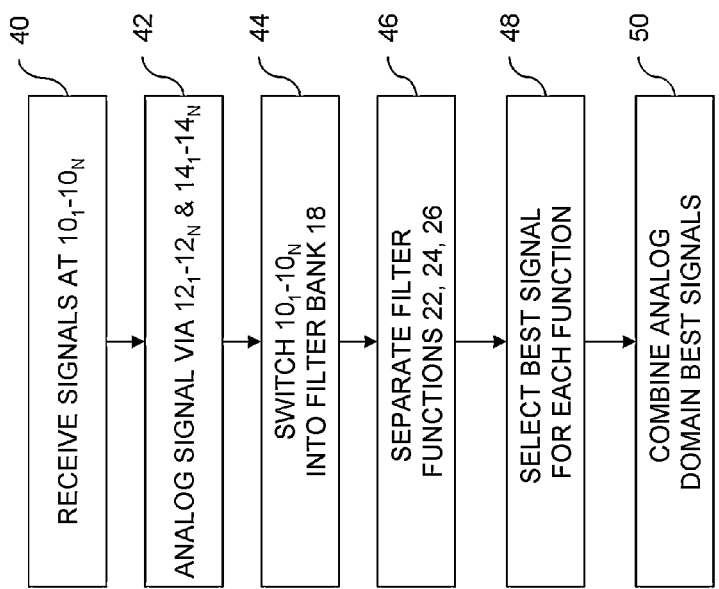
FIG. 1B is a block diagram illustrating a preferred method for receiving a predetermined (OFDM) frequency band containing a plurality of sub-bands usable with the FIG. 1A architecture.

FIG. 1A illustrates a preferred embodiment wireless OFDM receiver architecture of the invention and FIG. 1b illustrates a preferred method for receiving an OFDM signal. In FIG. 1A, a plurality of antennas $10_1$-$10_N$ receive signals (FIG. 1B 40) corresponding to a predetermined frequency band, e.g., 802.11a/g, that has a plurality of sub-bands for OFDM. Low noise amplifiers $12_1$-$12_N$ and mixers $14_1$-$14_N$ produce an analog signal (FIG. 1B 42) from the antennas $10_1$-$10_N$ for the predetermined Orthogonal Division Multiplexing frequency band in a conventional manner. A switch 16 switches (FIG. 1B 44) each of the antennas into a filter bank 18 that includes a plurality of filters or implements a plurality of filter functions (FIG. 1B 46). The switch sequentially switches each of the antennas into the filter bank, for example beginning with antenna $10_1$ and finishing with antenna $10_N$. Such sequential switching can be accomplished with a very simple controller. For simplicity of illustration and as an indication of a preferred embodiment, the filter bank 18 in FIG. 1A shows three filters 22, 24 and 26, respectively a low, mid, and high band pass filter. The low band pass filter 22 passes frequencies corresponding to the lower third of the frequency range of the predetermined Orthogonal Division Multiplexing frequency band. The mid band pass filter 24 passes frequencies corresponding to the middle third of the predetermined Orthogonal Division Multiplexing frequency band. The high band pass filter 26 passes frequencies corresponding to the upper third of the predetermined Orthogonal Division Multiplexing frequency band.

A selector and combiner 28 selects (FIG. 1B 48) the best signal from each of the filters 22, 24, and 26. In this manner, the signal from the particular antenna from the plurality of antennas $10_1$-$10_N$ that provides the best signal is selected for each of the low, mid, and high portions of the predetermined Orthogonal Division Multiplexing frequency band. The selector and combiner 28 can conduct selection and combination (FIG. 1B 50) of the time (analog) domain best signals in a conventional manner, such as by selection diversity. The best signal in a preferred embodiment is the strongest signal. The strongest signal may be determined by detecting the power level at the output of each of the filters 22, 24, and 26. Sufficient memory is provided in the selector and combiner 28 to store signals corresponding from each of the antennas for each of the low, mid, and high portions of the predetermined Orthogonal Division Multiplexing frequency band thereby permitting selection of the best signal. A programmable gain amplifier (PGA) 30 provides the combined signal to an analog to digital converter (A/D) 32, which provides the digital signal to a single discrete Fourier transformer (DFT) 34.

In preferred embodiments consistent with FIG. 1A, the filter bank 18 is a complex filter bank and is inserted into RF front end of the receiver, which is also part of channel selection filter. The added hardware complexity of the analog/RF receiver is minimal, and only a single A/D and DFT are required by the FIG. 1A receiver architecture. There is no additional cost for the baseband DSP chip and access point transmitter side. Instead, changes are only made in the RF receiver front end with minimal impact on size and power dissipation.

As a particular example embodiment consistent with the FIG. 1A embodiment, a IEEE 802.11a PHY Specification modified with the invention will be considered as an example platform. Artisans will appreciate additional features of the invention from the description of the particular example embodiment and will also appreciate the general applicability of the invention to other wireless OFDM standards.

Figure 2A:
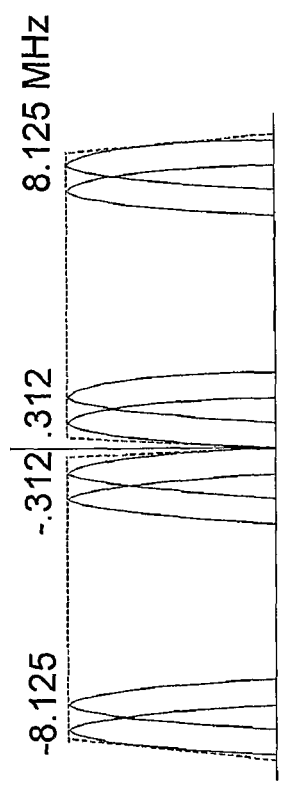
FIGS. 2A and 2B show the transfer function for a preferred an analog $2^{nd}$ order complex filter bank for use in a preferred embodiment according to FIG. 1, where
Figure 2B:
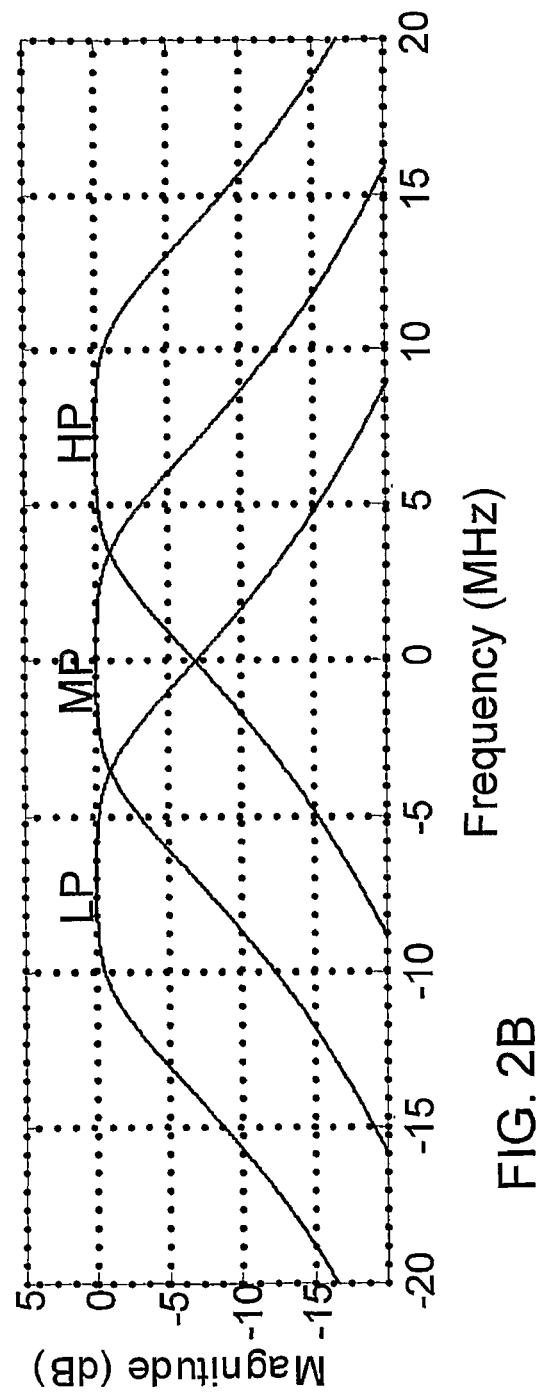

Embodiments of the invention achieve better system performance for WLAN OFDM systems with some changes only in RF front end. For 802.11a OFDM with multiple receive antennas $10_1$-$10_N$ the received radio frequency signals (at 5 GHz frequency) from each receive antenna $10_1$-$10_N$ are down-converted to baseband by the radio receiver including the low noise amplifier $12_1$-$12_N$ and mixer $14_1$-$14_N$, where they pass through an analog $2^{nd}$ order complex filter bank with transfer function given by (1) and plotted in FIGS. 2A and 2B, where FIG. 2A shows the sub-carrier location of the 802.11a band and FIG. 2B shows the complex response:

$$T(s) = \frac{a_0 \omega_0^2}{(s \pm j\omega_k)^2 + (s \pm j\omega_k)\frac{\omega_0}{Q} + \omega_0^2} \quad (1)$$

where $\omega_0$ is the pole frequency and $\omega_k$ is the frequency shift. In example embodiment of FIG. 1B, three complex filters 22, 24, and 26 are implemented (low band pass, band pass, and mid band pass) per receiver for minimum hardware complexity. Dividing the predetermined Orthogonal Division Multiplexing frequency band into smaller portions with additional filters will increase performance, but will add some complexity. Additionally, the gain in performance lessens with each additional filter. The filter output from the antenna $10_1$-$10_N$ with the highest received signal strength indicator (RSSI) is selected for each portion of the 802.11a band, and the resulting signals are summed by the selector and converter 28 for a single in-phase and quadrature (I/Q)output to the A/D converter 32.

For lower cost and lower power consumption, a direct conversion architecture is preferred. After a mixer, a 10-MHz complex baseband signal is available. From the design implementation perspective, it would be much easier to have a $2^{nd}$ order regular filter bank. However, it does have some disadvantages; i.e. it can not remove deep fading caused by Rayleigh Fading efficiently because of baseband signal overlapping by direct conversion. Also, it will have more chances to generate deep null by filter combining. To fully realize the potential of the architecture of the invention, the use of a complex baseband filter bank is preferred in the invention.

In preferred embodiments, the baseband I and Q streams are fed to on-chip channel selection low band pass filters, which provide most of the adjacent and non-adjacent channel rejection required by the 802.11a standard. They are normally implemented by using a Chebyschev low band pass filter with order between $4^{th}$ and $7^{th}$. Since embodiments of the invention can use $2^{nd}$ order complex filter banks for the signal diversity combining, the filter banks can be combined with $5^{th}$ order Chebyschev filters for the purpose of channel selection. Therefore the requirement for the channel selection filter can be relaxed with partial channel selection filtering by complex filter bank 18.

For Rayleigh fading channel, the fading amplitude α has a Rayleigh distribution, so the fading power $\alpha^2$ and consequently have a chi-square distribution with two degrees of freedom. The probability density function of signal-to-noise ratio γ due to the fading channel is given by $$p(\gamma) = \frac{1}{\Gamma}\exp\left(-\frac{\gamma}{\Gamma}\right) \quad \gamma \geq 0 \quad (2)$$

where Γ is the average value of the signal-to-noise ratio. With M antennas, each with an instantaneous SNR=γ, and n independent flat Rayleigh fading sub-bands, the general equation for the probability density function of the SNR for antenna selection diversity can be expressed as $$p(\gamma) = \frac{M\gamma^{n-1}}{n!\Gamma^n}e^{-\frac{\gamma}{\Gamma}}\left[(n-1)!\left(1 - e^{-\frac{\gamma}{\Gamma}}\sum_{k=0}^{n-1}\left(\frac{\gamma}{\Gamma}\right)^{n-k-1}\frac{1}{(n-k-1)!}\right)\right]^{M-1} \quad (3)$$

where Γ is the mean SNR of each antenna (when no diversity is used). Then, the average SNR improvement over Γ is given by (4)

$$\frac{\overline{\gamma}}{\Gamma} = \left(\int_0^\infty \gamma p(\gamma) d\gamma\right)/\Gamma \quad (4)$$

Figure 3:
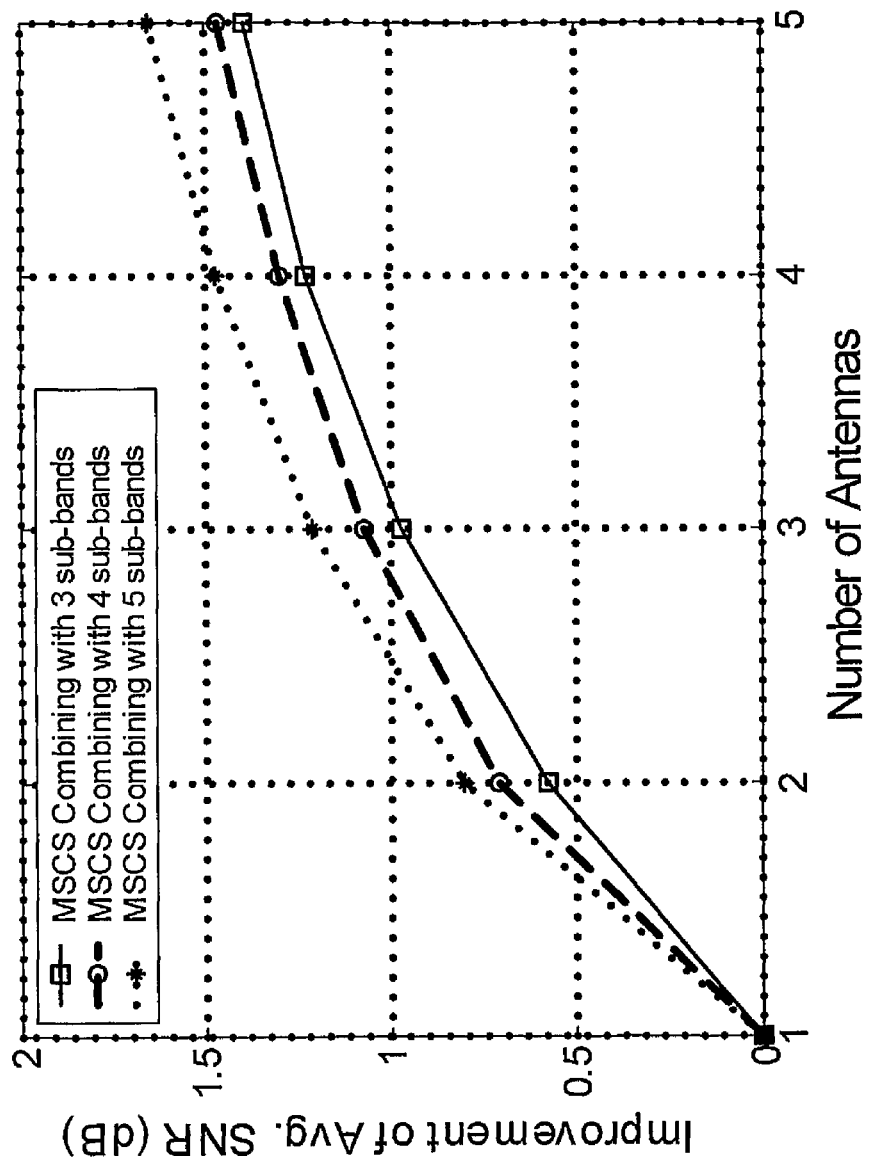
FIG. 3 plots the average SNR improvement of combining in accordance with the invention over conventional antenna selection.

If its assumed that the sub-bands covered by the complex filter bank all exhibit flat fading, then the performance of MSCS combining is equivalent to antenna selection with a single flat sub-band (n=1 in (3)). The average SNR improvement of combining in accordance with the invention over antenna selection is plotted in FIG. 3. It clearly shows that the performance improvement of combining according to the invention over antenna selection increases with the number of antennas, and can be as high as 1.6 dB for five antennas. Meanwhile, as the number of sub-bands n increases for a frequency selective channel, the performance of antenna selection will be degraded due to the increased possibility that some sub-carrier from the selected antenna may have lower amplitude than the corresponding sub-carrier of the other receive antennas. Therefore, the improvement of combining according to the invention over antenna selection becomes more significant, but more filters are also required.

Simulations were conducted to model a preferred embodiment, and aspects of the invention will be recognized by artisans. The system was simulated with the 54-Mb/s data rate mode of the IEEE 802.11a PHY layer with 64QAM modulation and ¾ coding rate [See, IEEE Standard 802.11a—1999: Wireless LAN MAC and PHY specifications—High-speed physical layer in the 5 GHz band, New York, IEEE, 2000]. The HIPERLAN/2 Channel model "A" with 18 paths was used. This represents a "typical" office environment for non-line-of-sight conditions and 50 ns average rms delay spread. Several typical simulation results showing the advantages and minor limitations of the example embodiments follow.

Figure 4:
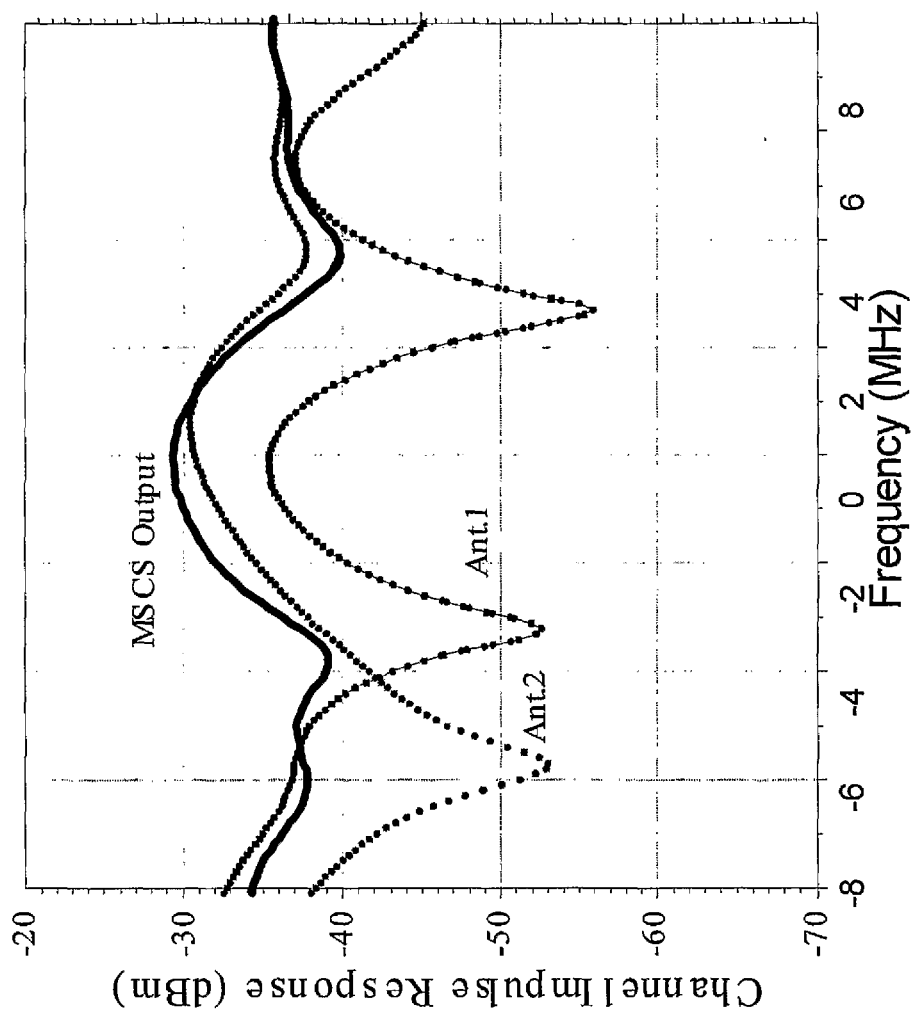
FIG. 4 shows simulation results indicating a typical channel impulse response for the invention (MSCS) implemented with two antennas.
Figure 5:
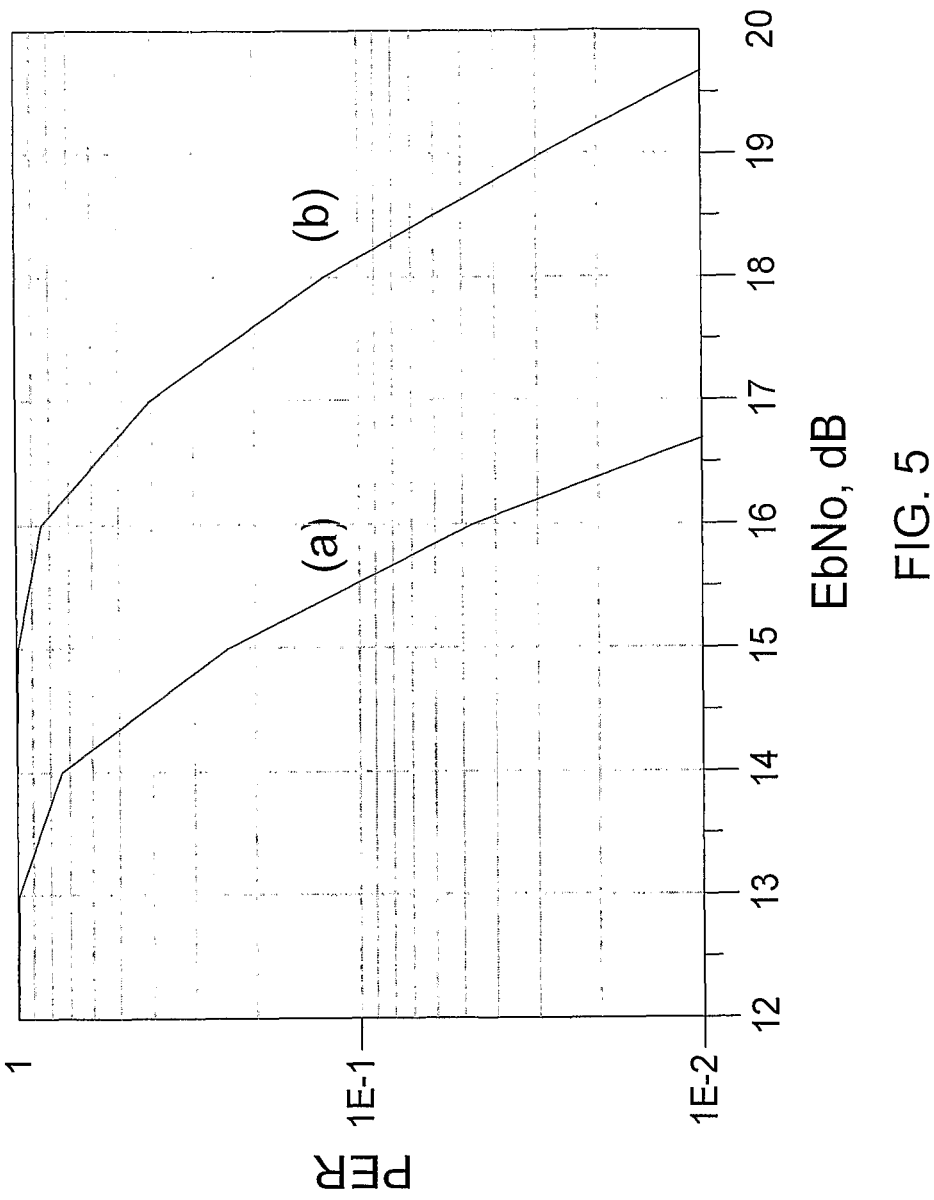
FIG. 5 shows simulation results of packet error rate for the invention (plot (a)) and for conventional antenna selection (plot (b))
Figure 6:
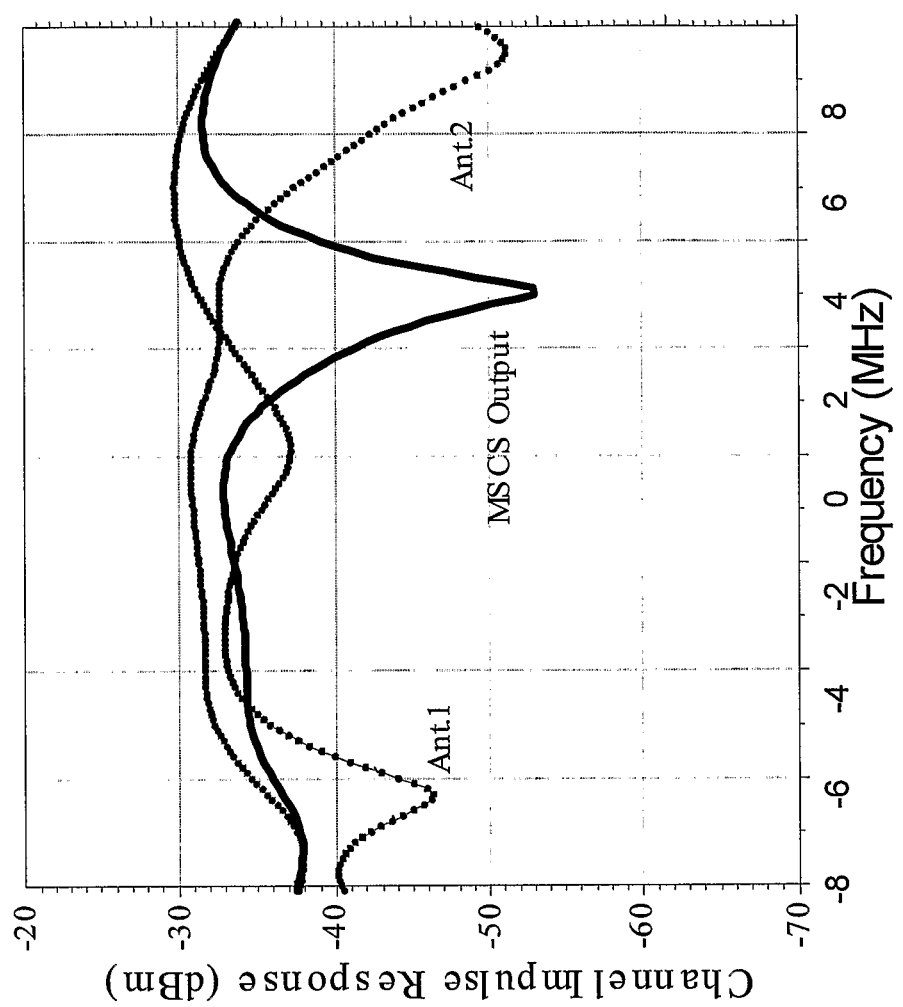
FIG. 6 shows simulation results of channel impulse response for the invention (MSCS Output) for two antennas showing an occasional virtual null.
Figure 7:
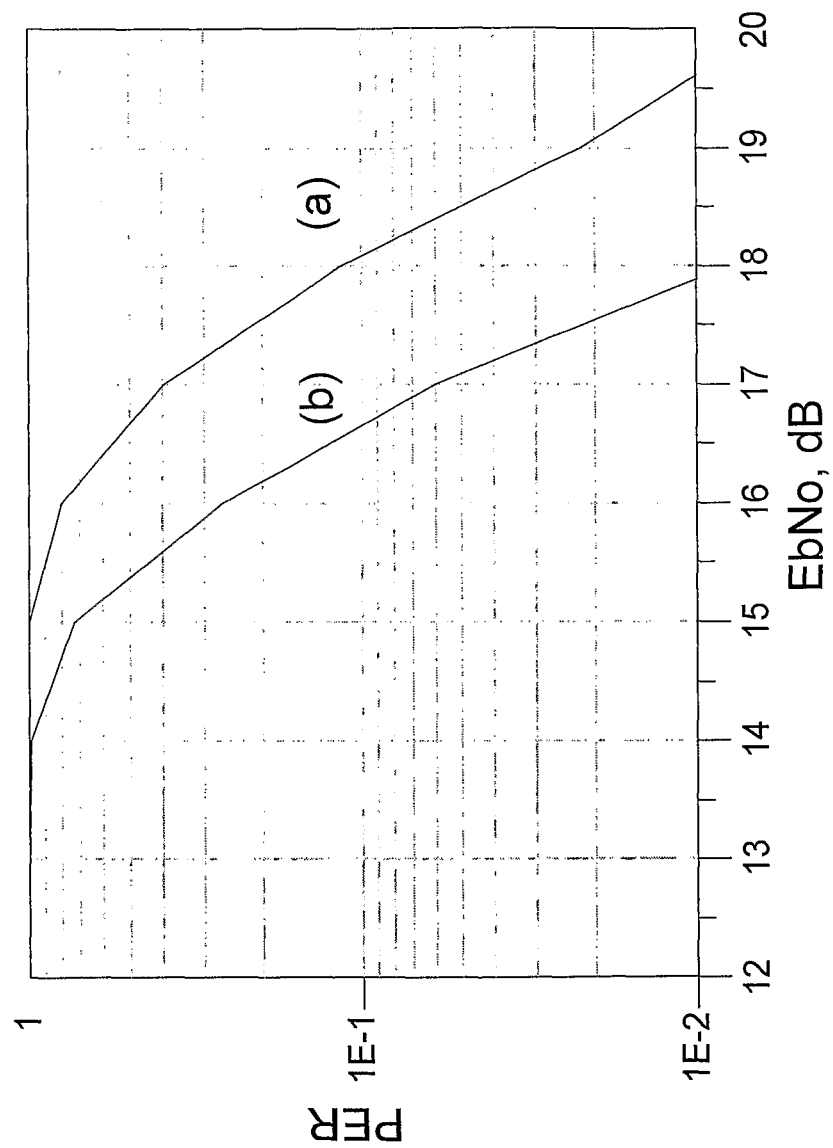
FIG. 7 shows simulation results of packet error rate for the invention (plot (a)) and for conventional antenna selection (plot (b)) under the occasional condition when a virtual null is generated.

FIGS. 4 and 5 show typical simulation results, with roughly a 2 dB improvement in overall SNR compared to simple selection diversity. FIG. 4 shows simulation results indicating a typical channel impulse response for the invention (MSCS) implemented with two antennas. FIG. 5 shows simulation results of packet error rate for the invention (plot (a)) and for conventional antenna selection (plot (b)). On rare occasions, the differing phase responses in the analog filters create a new "virtual" channel null, as seen in FIG. 6 (MSCS output). Obviously, when this happens the system performance may be degraded, and selection diversity provides the best performance. FIG. 7 shows the simulated packet error rate for this case. An intelligent switching can be designed here to switch to antenna diversity when a "virtual" null is generated.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A multiple sub-carrier selection combining receiver for receiver for receiving a predetermined Orthogonal Frequency Division Multiplexing frequency band containing a plurality of sub-bands comprising:
   a filter configured to receive signals in the predetermined Orthogonal Division Multiplexing frequency band sensed by each of a plurality of antennas, the filter implementing filtering to separately pass a plurality of separate portions of the predetermined Orthogonal Division Multiplexing frequency band from the each of the plurality of antennas:
   a selector and combiner configured to:
      evaluate output of said filter,
      select a signal sensed by one of the plurality of antennas for each of the separate portions of the predetermined Orthogonal Division Multiplexing frequency band and
      combine the selected signals in the (analog) domain to produce a combined signal covering the predetermined Orthogonal Division Multiplexing frequency band;
   a single analog to digital converter configured to convert the combined signal covering the predetermined Orthogonal Division Multiplexing frequency band; and
   a single discrete Fourier processor configured to receive the output of the single A/D converter.

2. The multiple sub-carrier selection combining receiver of claim 1, wherein said filter comprises an on-chip implementation as part of a channel selection filter.

3. The multiple sub-carrier selection combining receiver of claim 1, wherein the filter comprises a complex filter bank including a low band pass filter that passes a lower third of the predetermined Orthogonal Division Multiplexing frequency band, a mid band pass filter that passes a middle third of the predetermined Orthogonal Division Multiplexing frequency band, and a mid band pass filter that passes an upper third of predetermined frequency band.

4. The multiple sub-carrier selection combining receiver of claim 3, further comprising a switch for switching the signals in the predetermined Orthogonal Division Multiplexing frequency band sensed by each of the plurality of antennas into said complex filter bank.

5. A multiple sub-carrier selection combining receiver for receiving a predetermined Orthogonal Frequency Division Multiplexing frequency band containing a plurality of sub-bands, comprising:
   a filter configured to receive signals in the predetermined Orthogonal Division Multiplexing frequency band sensed by each of a plurality of antennas, the filter implementing filtering to separately pass a plurality of separate portions of the predetermined Orthogonal Division Multiplexing frequency band from the each of the plurality of antennas;
   a selector and combiner configured to:
      evaluate output of said filter,
      select a signal sensed by one of the plurality of antennas for each of the separate portions of the predetermined Orthogonal Division Multiplexing frequency band, and
      combine the selected signals in the time (analog) domain to produce a combined signal covering the predetermined Orthogonal Division Multiplexing frequency band; and
   a switch for switching the signals in the predetermined Orthogonal Division Multiplexing frequency hand sensed by each of the plurality of antennas into said filter.

6. A method for receiving a predetermined Orthogonal Frequency Division Multiplexing (OFDM) frequency band containing a plurality of sub-bands, comprising:
   sensing and isolating the predetermined Orthogonal Frequency Division Multiplexing (OFDM) frequency band with a plurality of antennas and a radio receiver;
   separately filtering portions of the predetermined Orthogonal Frequency Division Multiplexing (OFDM) frequency band for each of the plurality of antennas;
   selecting a signal from one of the plurality of antennas for each of the portions of the predetermined Orthogonal Frequency Division Multiplexing (OFDM) frequency band;
   combining, in the time (analog) domain, signals selected by said step of selecting;
   digitally converting a signal produced by said step of combining: and
   frequency domain converting a signal produced by said step of digitally converting.

7. A multiple sub-carrier selection combining receiver for receiving a predetermined Orthogonal Frequency Division Multiplexing frequency band containing a plurality of sub-bands, comprising:
   filter means for receiving signals in the predetermined Orthogonal Division Multiplexing frequency band and separately filtering portions of the predetermined Orthogonal Frequency Division Multiplexing (OFDM) frequency band for each of the plurality of antennas;
   time (analog) domain selecting means for selecting a signal from one of the plurality of antennas for each of the portions of the predetermined Orthogonal Frequency Division Multiplexing (OFDM) frequency band and for combining, in the time (analog) domain, selected signals: and
   switch means for separately applying the signals in the predetermined Orthogonal Division Multiplexing frequency band from each of the plurality of antennas to said filter means.

8. The multiple sub-carrier selection combining receiver of claim 7, wherein said switch means sequentially applies the signals in the predetermined Orthogonal Division Multiplexing frequency band from each of the plurality of antennas to said filter means.

9. The multiple sub-carrier selection combining receiver of claim 7, wherein said switch means further provides filtering for channel selection of the predetermined Orthogonal Division Multiplexing frequency band.

10. A multiple sub-carrier selection combining receiver for receiving a predetermined Orthogonal Frequency Division Multiplexing frequency band containing a plurality of sub-bands, comprising;
- a filter configured to receive signals in the predetermined Orthogonal Division Multiplexing frequency band sensed by each of a plurality of antennas, the filter implementing filtering to separately pass a plurality of separate portions of the predetermined Orthogonal Division Multiplexing frequency band from the each of the plurality of antennas;
- a selector and combiner configured to:
  - evaluate output of said filter,
  - select a signal sensed by one of the plurality of antennas for each of the separate portions of the predetermined Orthogonal Division Multiplexing frequency band, and
  - combine the selected signals in the time (analog) domain to produce a combined signal covering the predetermined Orthogonal Division Multiplexing frequency band; and
- wherein said selector and combiner is configured to combine the selected signals in the time (analog) domain to produce a combined signal covering the predetermined Orthogonal Division Multiplexing frequency band prior to digital frequency domain transformation of the selected signals.

* * * * *

UNITED STATES PATENT AND TRADEMARK OFFICE
CERTIFICATE OF CORRECTION

PATENT NO. : 8,462,868 B2  
APPLICATION NO. : 11/662516  
DATED : June 11, 2013  
INVENTOR(S) : Yang Sun et al.

Page 1 of 1

It is certified that error appears in the above-identified patent and that said Letters Patent is hereby corrected as shown below:

In the Specification:

Col. 4, line 14    After "FIG." please delete "1b" and insert --1B-- therefor.

In the Claims:

Col. 7, line 28    After "antennas" please delete the ":" and insert a --;-- therefor.  
Claim 1

Col. 7, line 33    After "band" please insert a --,--.  
Claim 1

Col. 7, line 53    After "upper third of" please insert --the--.  
Claim 2

Col. 8, line 15    After "frequency" please delete "hand" and insert --band-- therefor.  
Claim 5

Col. 8, line 36    Before "and" please delete the colon ":" and insert a --;-- therefor.  
Claim 6

Col. 8, line 53    After "signals" please delete the colon ":" and insert a --;-- therefor.  
Claim 7

Signed and Sealed this  
First Day of October, 2013

Teresa Stanek Rea  
*Deputy Director of the United States Patent and Trademark Office*